F. A. HEADSON.
PACKING.
APPLICATION FILED APR. 14, 1911.
1,161,213.
Patented Nov. 23, 1915.
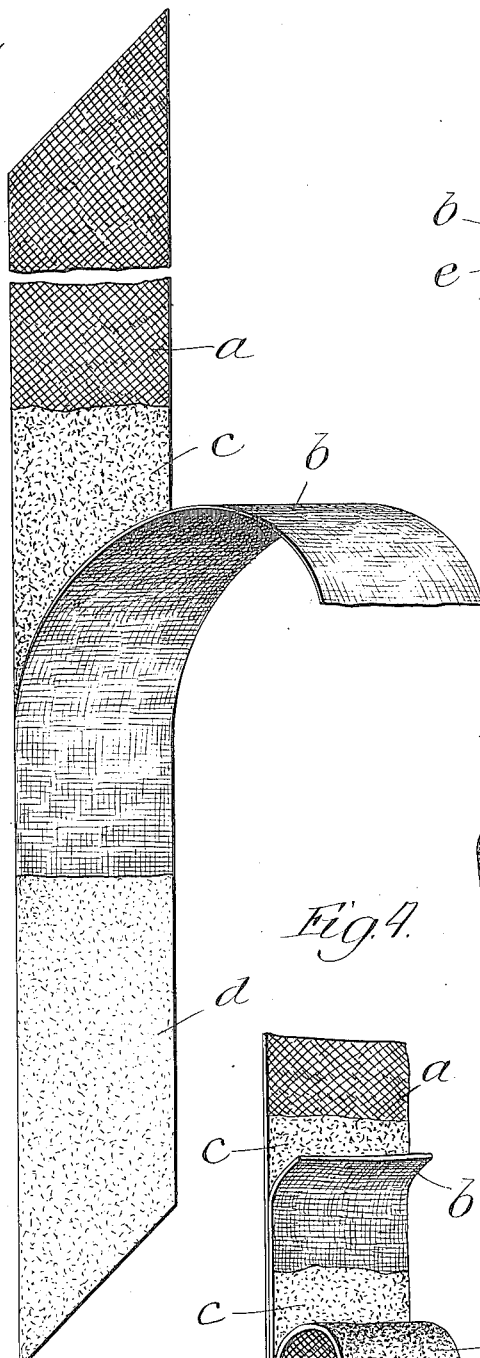
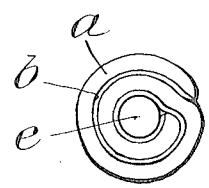
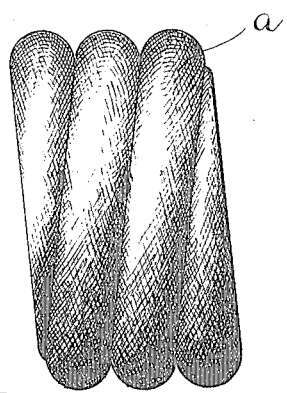
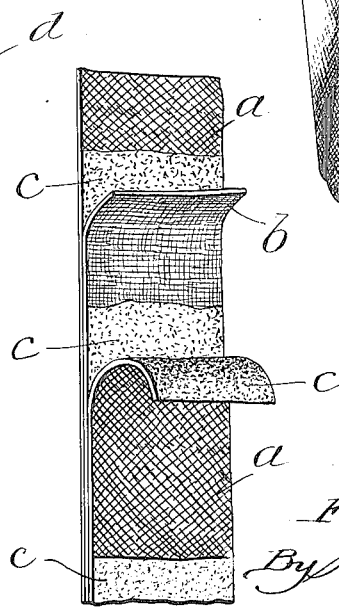

UNITED STATES PATENT OFFICE.

FRANK A. HEADSON, OF MILWAUKEE, WISCONSIN, ASSIGNOR TO H. W. JOHNS-MANVILLE COMPANY, OF MILWAUKEE, WISCONSIN, A CORPORATION OF NEW YORK.

PACKING.

1,161,213.        Specification of Letters Patent.        Patented Nov. 23, 1915.

Application filed April 14, 1911. Serial No. 621,103.

*To all whom it may concern:*

Be it known that I, FRANK A. HEADSON, a citizen of the United States, residing in Milwaukee, in the county of Milwaukee and State of Wisconsin, have invented certain new and useful Improvements in Packing, of which the following is a specification.

This invention relates to an article of manufacture comprising or composed of asbestos, or fibrous refractory, or fire-proof material, and a flexible or stronger sheet, layer, fibrous material or fabric laminated or united therewith.

The principal object of the invention is to provide a new article of manufacture comprising or composed of asbestos, or fibrous refractory or fire-proof material, united or laminated with fibrous, or flexible organic material or fabric, and adapted to be used as a packing for joints or between adjacent or relatively movable surfaces or parts; but more particularly to provide a simple, economical and efficient packing comprising asbestos, or fibrous refractory or fire-proof material, and an organic or more flexible strong fibrous material or fabric laminated or in the form of sheets or layers cemented or glued together, and to so construct, arrange and unite the layers or laminæ that the refractory or fire-proof and anti-friction material or asbestos will entirely cover and protect all of the less refractory or more combustible flexible material, fibers or fabric, and the latter material while so covered and protected will strengthen and insure the desired flexibility and durability of the article or packing formed by such layers and prevent to as great an extent as possible the disintegration and wearing away of the asbestos, or fibrous, refractory and anti-friction material, from moisture, heat and friction or other cause.

Other and further objects of the invention will appear from an examination of the drawings and the following description and claims.

The invention consists in the features, combinations, and details of construction herein described and claimed.

In the accompanying drawings, Figure 1 is a plan view of a piece of packing or flexible fibrous refractory material made in accordance with my invention and improvements; Fig. 2, an end view of a packing formed of a piece of material such as is illustrated in Fig. 1, wrapped around a suitable core and having the adjacent surfaces glued or cemented together; Fig. 3, a view in side elevation of a finished coil of packing formed of layers of asbestos and fibrous material of greater flexibility than asbestos and entirely covered by the latter, and Fig. 4, a perspective view of a piece of packing comprising a plurality of layers of asbestos or fibrous refractory or fire-proof material with a piece of fabric or relatively flexible organic material therebetween and cemented thereto.

In making a packing in accordance with my improvements and invention, I provide a strip or sheet of asbestos, or fibrous fire-proof or refractory material $a$ which, by preference, is woven, and forms a layer or lamina to one side or surface of which, at least, is secured a layer of organic or flexible fibrous material or fabric $b$. These layers or laminæ are laminated or held together by means of a coating of glue, rubber cement or cementitious material $c$ which is interposed therebetween in a heated, moist or liquid condition, after which pressure is applied causing the adhesive material $c$ to permeate the interstices of the layers $a$ and $b$. The adhesive material is then allowed to set, and serves to securely hold the layers together. The necessary pressure for the above purpose may be applied by passing the material between rolls. A coating of adhesive material formed of glue, rubber cement or similar cementitious material $d$ is applied to the outer side or surface of one of the layers—preferably the surface of the layer $b$—and, while said adhesive material is in a heated, moist or liquid condition, the laminated material may be laid, folded or rolled into the form desired, forming the finished product.

In making packing such as is illustrated in Fig. 2, the laminated material shown in Fig. 1 is rolled upon a core $e$ which may be of rubber or other suitable material, the layer $b$ of organic or flexible fibrous material or fabric being on the inner side of the layer $a$ of asbestos, so that the latter will entirely cover and protect all of the less refractory or more combustible and elastic and flexible material, fibers or fabric and form an anti-friction bearing surface which is adapted to be kept thoroughly lubricated while subjected to great heat. The organic, or more flexible and elastic fibrous material or fabric *b*,—while so entirely covered and protected from the heat and friction—serves to greatly strengthen the packing and to prevent to as great an extent as possible, the disintegration and wearing away of the less flexible asbestos, due to the action of moisture and heat, or friction or other causes and greatly increases the strength of the packing to withstand the strains to which it is subjected in use, particularly when exposed to the action of moisture and great heat.

The strength and durability of the packing is increased by making both of the layers *a* and *b* in the form of woven or knitted material or fabric, with the fibers or threads of the respective layers running at an oblique angle or on the bias with respect to each other. The fibers or threads of the strip *a* are shown extending on the bias in Fig. 1. The layer or layers or organic fibrous material or fabric may be made of cotton, hemp, flax, jute, sisal, or other fibrous material adapted to afford the desired strength, flexibility and elasticity.

Applicant purposes using any of the aforesaid materials or other suitable organic fibrous material in the layer or layers *b* or in connection with asbestos to form a packing such as is herein described, but does not limit himself to the use of any specific material or materials of which to make the packing or the elements thereof otherwise than as set forth in the claims, and does not limit the invention otherwise than as set forth in the claims as finally allowed.

A packing having great strength, and durability, and of great efficiency in withstanding the action of moisture and heat, is thus obtained.

In order to accomplish the best results the outermost lap or layer of the packing when in finished form should be of asbestos or refractory material.

My improved article of manufacture is shown in its preferred form in Figs. 1 and 2, and in a modified form in Fig. 4, in which the layers *a*, *a* are arranged adjacent to the opposite sides of a strip *b* of organic fibrous material or fabric, to which they are securely held by an adhesive material *c* formed of glue, rubber cement or similar material, the layers *a* in said figure being composed preferably of asbestos, and all of said layers being preferably constructed as and of the materials described with reference to Figs. 1, 2, and 3,—the difference between the form of the article or product shown in Fig. 4, as compared with that shown in Figs. 1, 2, and 3, being merely in the order of arrangement of the respective layers.

I claim:

1. A packing comprising in its construction a flexible layer formed of woven strands of fibrous asbestos, a flexible layer of fabric adjacent to and having strands extending diagonally with respect to the strands of asbestos, and flexible adhesive material between and connecting said layers, said connected layers being folded together and adhesively secured in folded position.

2. A packing comprising in its construction a flexible layer of woven fibrous asbestos, a flexible layer of fabric formed of fibrous material adjacent to and having fibers extending diagonally with respect to the woven strands of fibrous asbestos, and flexible adhesive material between and connecting said elements, said layers being wound around each other and having the asbestos layer extending entirely around the outside of all of the other parts.

FRANK A. HEADSON.

Witnesses:
 OTTO F. BERGMAN,
 FRED C. HANSEN.